US009545697B2

(12) United States Patent
Whinnem et al.

(10) Patent No.: US 9,545,697 B2
(45) Date of Patent: Jan. 17, 2017

(54) AUTOMATED HOLE GENERATION

(75) Inventors: Eric Whinnem, Whittier, CA (US);
Gary A. Lipczynski, Riverside, CA (US); John A. Baumann, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 2417 days.

(21) Appl. No.: 12/419,054

(22) Filed: Apr. 6, 2009

(65) Prior Publication Data
US 2010/0254778 A1    Oct. 7, 2010

(51) Int. Cl.
B23B 39/00    (2006.01)
B23B 47/00    (2006.01)
B23B 47/28    (2006.01)
B23Q 1/54    (2006.01)
B23Q 9/00    (2006.01)

(52) U.S. Cl.
CPC ........... B23Q 1/5462 (2013.01); B23Q 9/0014 (2013.01); Y10T 29/49622 (2015.01); Y10T 29/5107 (2015.01); Y10T 408/03 (2015.01); Y10T 408/55 (2015.01); Y10T 408/554 (2015.01)

(58) Field of Classification Search
USPC ............ 29/26 A, 26 B, 34 B, 709, 714, 721; 409/132, 201, 211, 235; 408/236, 1 R, 72 R; 74/479.01, 490.07, 490.05, 490.13; 173/32, 173/1; 901/19, 22, 23
See application file for complete search history.

(56) References Cited

U.S. PATENT DOCUMENTS

| | | | | |
|---|---|---|---|---|
| 4,819,496 A | * | 4/1989 | Shelef | 74/490.03 |
| 4,940,382 A | * | 7/1990 | Castelain et al. | 414/749.1 |
| 5,028,180 A | | 7/1991 | Sheldon et al. | |
| 5,354,158 A | * | 10/1994 | Sheldon et al. | 409/201 |
| 5,388,935 A | | 2/1995 | Sheldon | |
| 5,401,128 A | | 3/1995 | Lindem et al. | |
| 5,468,099 A | * | 11/1995 | Wheetley et al. | 408/1 R |
| 5,538,373 A | * | 7/1996 | Kirkham | 409/131 |
| 5,656,905 A | * | 8/1997 | Tsai | 318/568.21 |
| 5,715,729 A | * | 2/1998 | Toyama et al. | 74/490.03 |
| 5,771,747 A | * | 6/1998 | Sheldon | 74/490.01 |
| 5,813,287 A | * | 9/1998 | McMurtry et al. | 74/490.06 |
| 5,901,936 A | * | 5/1999 | Bieg | 248/370 |
| 5,941,128 A | * | 8/1999 | Toyama et al. | 74/490.06 |
| 5,987,726 A | * | 11/1999 | Akeel | 29/407.08 |

(Continued)

FOREIGN PATENT DOCUMENTS

EP    1918067 A2    5/2008
FR    2809034 A1    11/2001

OTHER PUBLICATIONS

EP Search Report for application 10157743.5-2302 dated Aug. 10, 2010.

(Continued)

*Primary Examiner* — Essama Omgba
(74) *Attorney, Agent, or Firm* — Yee & Associates, P.C.

(57) ABSTRACT

A method for performing operations on a structure. A moveable platform may be positioned in an area relative to the structure to define a working envelope. The moveable platform may be connected to a tool that may be moved around a plurality of axes within the working envelope using the moveable platform. The tool may be moved to a plurality of locations within the working envelope using the moveable platform. An operation may be performed with the tool through the working envelope at each of the plurality of locations using the moveable platform.

17 Claims, 8 Drawing Sheets

(56) References Cited

U.S. PATENT DOCUMENTS

| | | | |
|---|---|---|---|
| 6,048,143 A * | 4/2000 | Chang et al. | 409/201 |
| 6,161,992 A * | 12/2000 | Holy et al. | 409/134 |
| 6,196,081 B1 * | 3/2001 | Yau | 74/479.01 |
| 6,240,799 B1 * | 6/2001 | Yau | 74/490.03 |
| 6,285,098 B1 * | 9/2001 | Nestler et al. | 310/12.32 |
| 6,330,837 B1 * | 12/2001 | Charles et al. | 74/490.06 |
| 6,378,190 B2 * | 4/2002 | Akeel | 29/407.08 |
| 6,382,889 B1 | 5/2002 | Brown et al. | |
| 6,425,177 B1 * | 7/2002 | Akeel | 29/714 |
| 6,477,912 B2 * | 11/2002 | Song et al. | 74/490.06 |
| 6,557,235 B1 * | 5/2003 | Katz et al. | 29/563 |
| 6,575,676 B2 | 6/2003 | Wang et al. | |
| 6,719,506 B2 * | 4/2004 | Chang et al. | 409/201 |
| 6,843,328 B2 * | 1/2005 | Boyl-Davis et al. | 173/32 |
| 6,926,094 B2 * | 8/2005 | Arntson et al. | 173/32 |
| 7,165,630 B2 * | 1/2007 | Arntson et al. | 173/1 |
| 7,264,426 B2 * | 9/2007 | Buttrick, Jr. | 408/1 R |
| 7,273,333 B2 * | 9/2007 | Buttrick et al. | 408/76 |
| 7,673,384 B2 * | 3/2010 | O'Connell et al. | 29/787 |
| 7,849,762 B2 * | 12/2010 | Viola | 74/490.08 |
| 8,074,369 B2 * | 12/2011 | McMurtry | 33/503 |
| 8,225,692 B2 * | 7/2012 | Kock et al. | 74/490.03 |
| 2002/0007548 A1 * | 1/2002 | Stoewer et al. | 29/525.06 |
| 2003/0116331 A1 * | 6/2003 | Boyl-Davis et al. | 173/1 |
| 2004/0262020 A1 | 12/2004 | Arntson et al. | |
| 2007/0014645 A1 * | 1/2007 | Amirehteshami et al. | 409/132 |
| 2008/0078266 A1 * | 4/2008 | Soetebier et al. | 74/490.13 |
| 2008/0244888 A1 | 10/2008 | Sarh | |
| 2009/0065664 A1 * | 3/2009 | Kock et al. | 248/157 |
| 2010/0122602 A1 * | 5/2010 | Marcroft et al. | 74/490.03 |
| 2011/0194906 A1 * | 8/2011 | Allen et al. | 409/201 |

OTHER PUBLICATIONS

"Description of functions Exechon kinematics DLL", Optikos, Mar. 12, 2007 Edition, pp. 1-7.

"New Machine Tool Breaks the Mold", 1 page, retrieved Apr. 6, 2009 http://nist.gov/public_affairs/gallery/hexpod.htm.

* cited by examiner

AUTOMATED HOLE GENERATION

BACKGROUND INFORMATION

1. Field

The present disclosure relates generally to manufacturing and, in particular, to a method and apparatus for forming holes. Still more particularly, the present disclosure relates to a method and apparatus for automatically generating holes in a structure.

2. Background

In manufacturing aircraft, various parts may be manufactured and assembled to form different structures for an aircraft. For example, without limitation, ribs, stringers, and spars may be arranged in a wing structure for a wing. Skin panels may then be placed over the structure for the wing and secured to the structure to form the wing.

In assembling spars, stringers, and ribs together to form the wing structure, holes may be drilled through the different parts, and fasteners may be secured in the holes to connect and/or attach the parts to each other. When skin panels are attached to the wing structure, thousands of holes may be drilled in the skin panels and/or portions of the wing structure. Fasteners may then be installed to attach the skin panels to the wing structure.

Drilling holes in an aircraft structure in final assembly may be considered a critical path process. For example, without limitation, the placement, size, orientation, and other factors for these holes may be important in insuring that the different parts can be secured within desired tolerances.

Currently available methods for drilling holes in the final assembly of an aircraft structure may involve multiple aircraft mechanics. The aircraft mechanics may be positioned in difficult to access areas around and/or in the structure to drill the holes using handheld power tools. This type of process may be tedious, exacting, and/or time consuming.

Further, current methods also may employ automated drilling systems. These drilling systems may be designed with mass and/or rigid foundation to react to forces created by the drilling process and may be difficult to position. In other words, the positioning of a spindle in an automated drilling system in the X, Y, and Z vector orientations for drilling may be difficult to perform in the assembly of the aircraft.

Further, the large size of the automated drilling machines and their movements may prevent aircraft mechanics from entering the area in and/or around which these machines are located to perform other tasks, while the automated drilling machine is in use. As a result, other tasks may be delayed until the drilling operations have been completed for a particular area.

Further, most holes drilled in the structure may be drilled in strips of several rows or pattern, that are not wide, but very long in length. These holes may be used to install fasteners and splice pieces of the aircraft together. Any automation must, at minimum, be able to traverse the width and length of a splice.

Therefore, it would be advantageous to have a method that takes into account one or more of the issues discussed above, as well as possibly other issues.

SUMMARY

In one advantageous embodiment, a method may be present for performing operations on a structure. A moveable platform may be positioned in an area relative to the structure to define a working envelope. The moveable platform may be connected to a tool that may be moveable around a plurality of axes within the working envelope using the moveable platform. The tool may be moved to a plurality of locations within the working envelope using the moveable platform. An operation may be performed with the tool through the working envelope at each of the plurality of locations using the moveable platform.

In another advantageous embodiment, a method may be present for drilling holes in an aircraft structure. A fixed platform associated with a moveable platform may be placed in the form of a hexapod in an area relative to the aircraft structure to define a working envelope. The moveable platform may be connected to a cutting tool that may be moveable around a plurality of axes using the moveable platform. The working envelope may be defined by an opening in the fixed platform in which the opening may expose a surface of the aircraft structure to the cutting tool. The cutting tool may be moved to a plurality of locations within the working envelope using the moveable platform. The cutting tool may be normalized relative to the aircraft structure prior to performing an operation at each of the plurality of locations. A drilling operation may be performed through the working envelope at each of the plurality of locations using the moveable platform to form a plurality of holes in the aircraft structure in the area. This drilling operation may be performed by positioning a cutting tool over the surface of the aircraft structure in a selected position that may be offset from a centerline for a hole using the moveable platform at each of the plurality of locations, rotating the cutting tool in response to positioning the cutting tool, moving the cutting tool into the surface of the aircraft structure using the moveable platform in response to rotating the cutting tool, and moving the cutting tool around the centerline using the moveable platform in response to rotating the cutting tool. The fixed platform may be placed at the area by moving the moveable platform on a track system attached to the structure to the area. The fixed platform may be attached to a carriage capable of moving along the track system. The moving and performing steps may be controlled by a processor unit executing program code, wherein the program code may define a plurality of operations.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
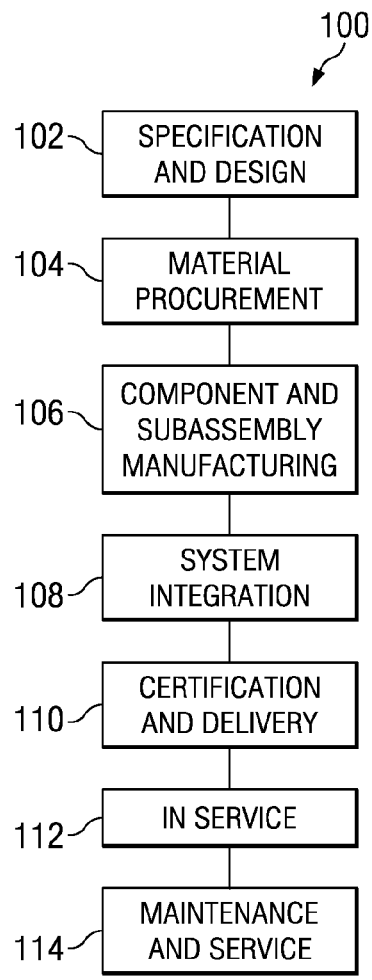
FIG. 1 is an illustration of an aircraft manufacturing and service method in accordance with an advantageous embodiment.
Figure 2:
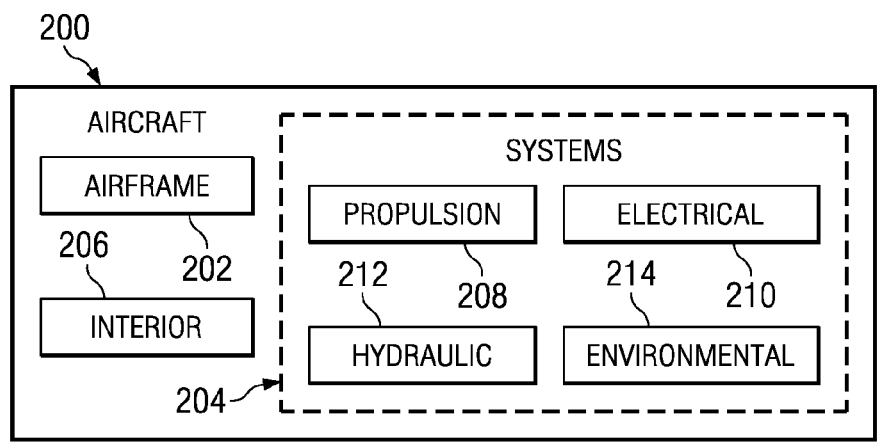
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As an illustrative example, the different advantageous embodiments may be implemented during at least one of component and subassembly manufacturing 106, system integration 108, and maintenance and service 114. As used herein, the phrase "at least one of", when used with a list of items, means that different combinations of one or more of the listed items may be used and only one of each item in the list may be needed. For example, "at least one of item A, item B, and item C" may include, for example, without limitation, item A; or item A and item B. This example also may include item A, item B, and item C; or item B and item C.

More specifically, one or more of the different advantageous embodiments may be implemented to perform operations to manufacture structures for aircraft 200. These operations may include, for example, without limitation, drilling holes for installing fastener systems to secure parts to each other in the structure for aircraft 200. For example, holes may be drilled within structures for airframe 202 to secure skin panels to the structures for airframe 202.

The different advantageous embodiments recognize and take into account a number of different considerations. For example, the different advantageous embodiments recognize and take into account that existing solutions may not be able to provide the desired level of precision needed to drill holes and/or may not be able to allow other tasks to be performed concurrently in the same area in which holes may be drilled. Although portable drilling machines may be used to drill holes, these types of machines, however, may be too heavy and/or unwieldy for one person to lift and/or operate.

Also, these types of machines may be manually mounted on a dedicated drill plate. The drill plate may be positioned in the selected position to drill a hole. This positioning uses axes for the drill plate. After the drill plate has been adjusted, the drilling operation may be performed using axes for the portable drilling machine. In other words, the positioning of the drill plate uses axes for one mechanism or positioning device, while the drilling operation uses axes for another device, the drill. The different advantageous embodiments recognize and take into account that the use of two different axes requires additional components. These additional components may increase the complexity, the size, and the cost for a drilling apparatus.

After each hole is drilled, the different advantageous embodiments recognize and take into account that the aircraft mechanic may manually remove the portable drilling machine from the drill plate, move the machine to the next location, and re-attach the machine to the drill plate. The different advantageous embodiments recognize and take into account that this type of process may be very time consuming and may increase the cost of manufacturing an aircraft.

The different advantageous embodiments also recognize and take into account that this type of machine may be floor mounted. When drilling holes, an automated drilling machine may be subjected to movements and/or vibrations caused by other activities being performed in the assembly process.

Thus, the different advantageous embodiments provide a method for performing operations on a structure. In one or more of the different advantageous embodiments, a moveable platform may be maintained in an area relative to a structure to define a working envelope. The moveable platform may be connected to a cutting tool that may be caused to move around by activation of a plurality of axes connected to the moveable platform. The cutting tool may be moved to the plurality of locations within the work envelope using the moveable platform with the plurality of axes. An operation may be performed through the working envelope at each of the plurality of locations using the moveable platform with the plurality of axes.

In other words, the positioning of the tool and/or the operation may be performed using the moveable platform with the plurality of axes. The same mechanism may be used to position the tool and perform the operation. This process may result in the capability of using a smaller manufacturing apparatus, as compared to currently used techniques for performing operations at different locations on a structure.

In one advantageous embodiment, a method may be present for performing operations on a structure. A rail system may be positioned to straddle a splice. A carriage would travel along the rails and lock into place along the way. A numerically controlled device with a plurality of axes may be mounted upon the carriage. The numerically controlled device may have a fixed platform upon which the actuation systems of a plurality of axes are attached. A moveable platform may be positioned upon the actuation systems in an area relative to the structure to define a working envelope.

The moveable platform may be connected to a cutting tool that may be moved around within the working envelope by the actuation of the plurality of axes. The tool may be moved to a plurality of locations within the working envelope using the moveable platform. An operation may be performed with the tool within the working envelope at each of the plurality of locations using the moveable platform.

Figure 3:
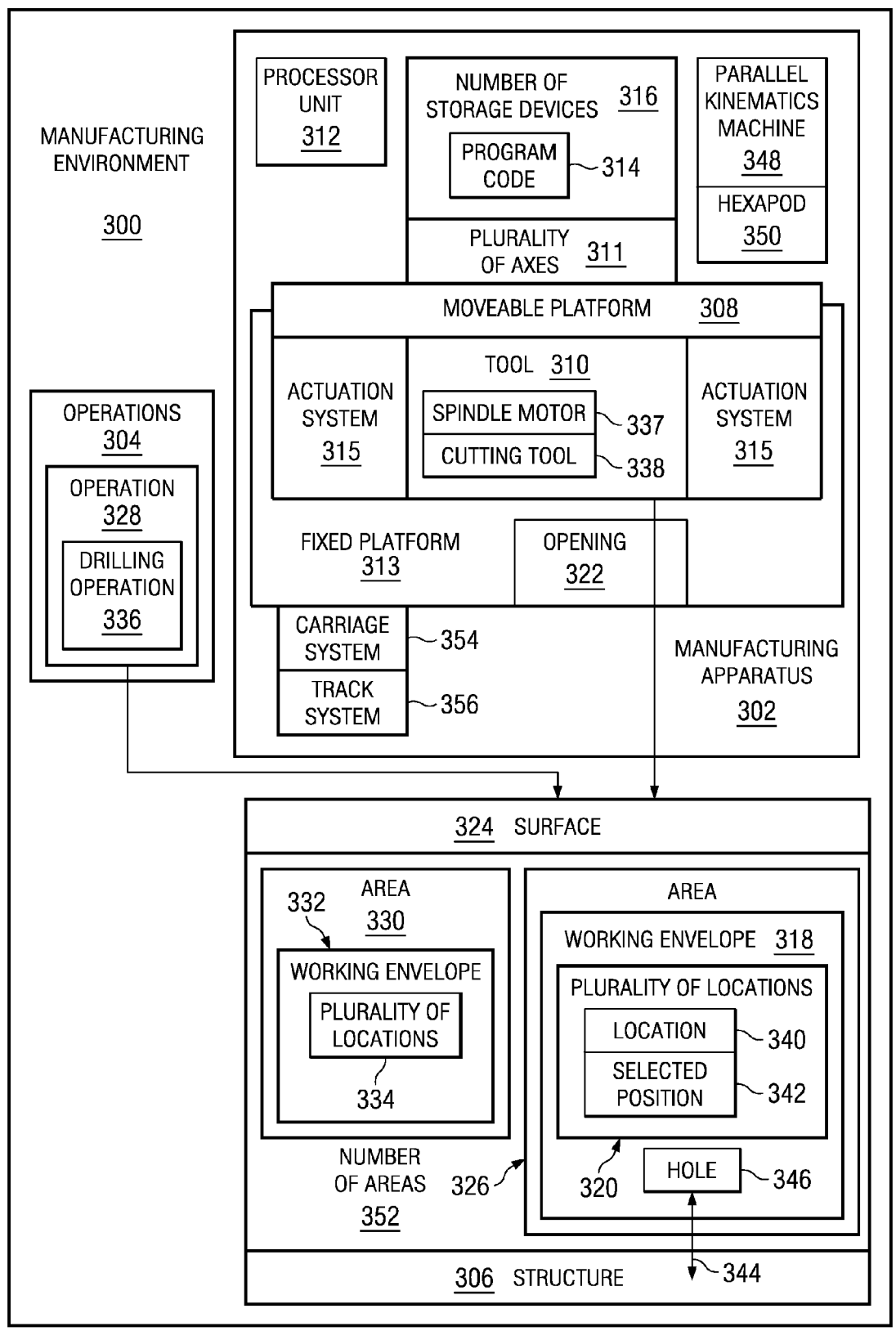
FIG. 3 is an illustration of a manufacturing environment in accordance with an advantageous embodiment.

Turning now to FIG. 3, an illustration of a manufacturing environment is depicted in accordance with an advantageous embodiment. Manufacturing environment 300 is an example of a manufacturing environment that may be used to manufacture aircraft 200 in FIG. 2.

In the illustrative example, manufacturing apparatus 302 may be used to perform operations 304 on structure 306. These operations may take various forms, depending on the particular implementation. For example, without limitation, operations 304 may include a drilling operation, a riveting operation, a boring operation, a fastening operation, a sealing operation, a measurement operation, a marking operation, a painting operation, and/or some other suitable type of operation. This drilling operation may be drilling operation 336.

Manufacturing apparatus 302 may have moveable platform 308, which may be connected to tool 310. Moveable platform 308 may be capable of moving tool 310 using plurality of axes 311. This type of movement may provide, for example, without limitation, six degrees of freedom for tool 310. In these examples, plurality of axes 311 may include an X-axis, a Y-axis, and a Z-axis. Further, rotation about these axes may be provided to obtain six degrees of freedom for moving tool 310.

Moveable platform 308 may be associated with fixed platform 313 in these examples. Moveable platform 308 may be associated with fixed platform 313 by being attached to, secured to, bonded to, adhered to, and/or being part of fixed platform 313. In these illustrative examples, moveable platform 308 may move relative to fixed platform 313.

Fixed platform 313 may be attached to, secured to, and/or otherwise maintained with respect to structure 306. Further, moveable platform 308 also may move tool 310 relative to fixed platform 313 to perform operations 304.

Moveable platform 308 may be moveably attached to fixed platform 313 by actuation system 315. Actuation system 315 may be, for example, without limitation, a number of members and actuators that may move moveable platform 308. Further, actuation system 315 also may connect tool 310 to moveable platform. In the illustrative examples, moveable platform 308 may be attached to fixed platform 313.

In these illustrative examples, moveable platform 308 and tool 310 may be controlled using processor unit 312. Processor unit 312 may execute program code 314 located in number of storage devices 316. Processor unit 312 may comprise a single central processing unit, a multi-core processor, a plurality of processors, and/or some other suitable type of device capable of controlling manufacturing apparatus 302 to perform operations 304 in structure 306.

In these depicted examples, program code 314 may be stored in number of storage devices 316. Number of storage devices 316 may be capable of storing program code 314 in a functional form for execution by processor unit 312. Number of storage devices 316 may be, for example, at least one of a random access memory, a read-only memory, a hard disk drive, a solid state disk drive, and/or some other suitable type of storage device. A number, as used herein, with reference to items, refers to one or more items. For example, a number of storage devices are one or more storage devices.

In this illustrative example, fixed platform 313 may have working envelope 318 through which operations 304 may be performed using tool 310 on plurality of locations 320 within working envelope 318. Working envelope 318 may be any portion of structure 306 capable of being reached by tool 310 using moveable platform 308 to perform operation 328. Working envelope 318 may be any area and/or volume in or through which tool 310 may reach plurality of locations 320 to perform operations 304.

In this depicted example, working envelope 318 may be defined by opening 322 in fixed platform 313. Opening 322 may expose surface 324 of structure 306 when moveable platform 308 may be maintained in area 326 relative to structure 306. In these illustrative examples, moveable platform 308 may be placed in area 326 relative to structure 306. Placement of moveable platform 308 may move and/or be positioned relative to fixed platform 313 with opening 322 to define working envelope 318.

Of course, in other advantageous embodiments, working envelope 318 may be defined in other ways. For example, instead of opening 322, working envelope 318 may be an area and/or volume in or through which a portion of structure 306 that can be reached by tool 310 when moved by moveable platform 308.

Tool 310 may be moved to plurality of locations 320 using moveable platform 308 with plurality of axes 311. Further, tool 310 may be used to perform operation 328 in operations 304 to each of plurality of locations 320 in this illustrative example.

Operation 328 may be performed using moveable platform 308 with plurality of axes 311 in the different advantageous embodiments. In other words, moveable platform 308 may both move tool 310 to different locations in plurality of locations 320 and move tool 310 to perform operation 328 in each of plurality of locations 320. The movement of tool 310 and the performance of operation 328 using tool 310 may be performed with plurality of axes 311 using moveable platform 308.

After operation 328 has been performed for each of plurality of locations 320, moveable platform 308 may be transferred to another position, such as area 330 on structure 306, to form a second working envelope, working envelope 332. At area 330, operation 328 may be performed on each of plurality of locations 334 in working envelope 332.

As can be seen, the positioning and moving of tool 310 at area 326 and area 330 may be performed using moveable platform 308. Plurality of axes 311 for moveable platform 308 may be used to move tool 310 to plurality of locations 320 and plurality of locations 334 and to perform operation 328 at each of plurality of locations 320 and plurality of locations 334. In the illustrative examples, actuation system 315 also may connect tool 310 to moveable platform 308. In this manner, actuation system 315 may move tool 310 along an axis within plurality of axes 311 relative to moveable platform 308.

In these illustrative examples, tool 310 may take the form of spindle motor 337 and cutting tool 338. Operation 328, in these examples, may be drilling operation 336. In this illustrative example, tool 310 may be moved to location 340 in plurality of locations 320 using moveable platform 308 with plurality of axes 311 for moveable platform 308. Thereafter, cutting tool 338 may be positioned over surface 324 at location 340 at selected position 342 by moveable platform 308.

In positioning cutting tool 338 over surface 324, cutting tool 338 may be offset from centerline 344 of hole 346 to drill hole 346 at location 340 using moveable platform 308. Centerline 344 may be an axis normal to surface 324 of structure 306. Thereafter, cutting tool 338 may be rotated. Cutting tool 338 may be moved into surface 324 of structure 306 using moveable platform 308 while cutting tool 338 is rotating.

Additionally, cutting tool 338 may be moved around centerline 344 by moveable platform 308 to form hole 346. In these examples, the movement of cutting tool 338 may be, for example, without limitation, circular to form a circular hole. Of course, in other advantageous embodiments, other shapes for hole 346 may be formed. For example, without limitation, hole 346 may be a square hole, a rectangular hole, an oval hole, or some other suitable hole shape.

Although in these illustrative examples, tool 310 is illustrated as spindle motor 337 with cutting tool 338, tool 310 may take other forms, depending on the particular implementation. Tool 310 may be, for example, without limitation, a rivet gun, a sealant applicator, a paint gun, a fastener machine, a laser, an ultrasonic drill, a probe, and/or some other suitable tool. With the different tools, operation 328 may include, for example, without limitation, a drilling operation, a riveting operation, a boring operation, a fastening operation, a sealing operation, a measurement operation, a marking operation, and a painting operation.

In the advantageous embodiments, fixed platform 313, actuation system 315, and moveable platform 308 may take various forms. For example, without limitation, fixed platform 313, actuation system 315, and moveable platform 308 may be embodied by parallel kinematics machine 348, hexapod 350, and/or any other suitable platform.

Further, fixed platform 313, actuation system 315, and moveable platform 308 may be moved to number of areas 352 in addition to area 330. Of course, in some advantageous embodiments, fixed platform 313 may be unnecessary. With this type of implementation, actuation system 315 may be directly attached to surface 324 of structure 306. Fixed platform 313 may be attached to carriage system 354. Carriage system 354 may be capable of moving fixed platform 313, actuation system 315, moveable platform 308, and tool 310 on track system 356. Track system 356 may be attached to structure 306.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional moveable platforms in addition to moveable platform 308 may be present to perform operations 304 on structure 306. In yet other advantageous embodiments, an additional tool, in addition to tool 310, may be present to perform operation 328 on plurality of locations 320 through working envelope 318. In still other advantageous embodiments, additional working envelopes may be present in moveable platform 308 in addition to working envelope 332.

In some advantageous embodiments, program code 314 may be executed by another processing unit remote to processor unit 312. With this type of implementation, commands may be sent to processor unit 312 through a communications link to perform operations on structure 306.

As another example, movable platform 308 may normalize tool 310 relative to structure 306 prior to performing operation 328. As a specific non-limiting example, movable platform 308 may normalize cutting tool 338 relative to surface 324 of structure 306 before performing operation 328.

Figure 4:
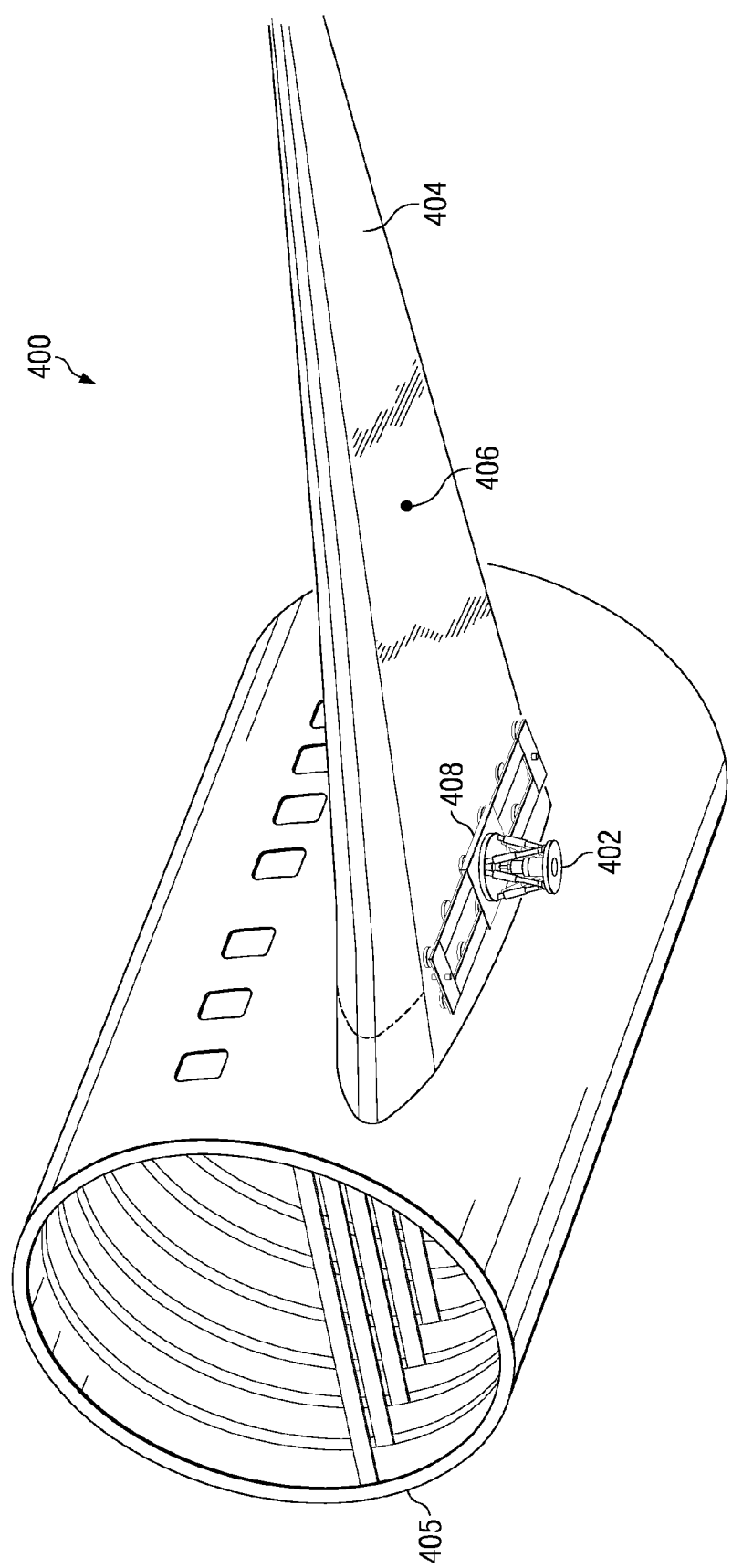
FIG. 4 is an illustration of a manufacturing environment in accordance with an advantageous embodiment.

Turning now to FIG. 4, an illustration of a manufacturing environment is depicted in accordance with an advantageous embodiment. In this illustrative example, manufacturing environment 400 is an example of one implementation for manufacturing environment 300 in FIG. 3.

In this particular example, manufacturing apparatus 402 may be used to perform operations on structure 404 attached to fuselage 405. Manufacturing apparatus 402 may perform operations on surface 406 of structure 404. As can be seen in this illustrative example, manufacturing apparatus 402 may be attached to surface 406 to perform operations at positions 408 on surface 406 of structure 404. Manufacturing apparatus 402 also may be used to perform operations on fuselage 405.

Figure 5:
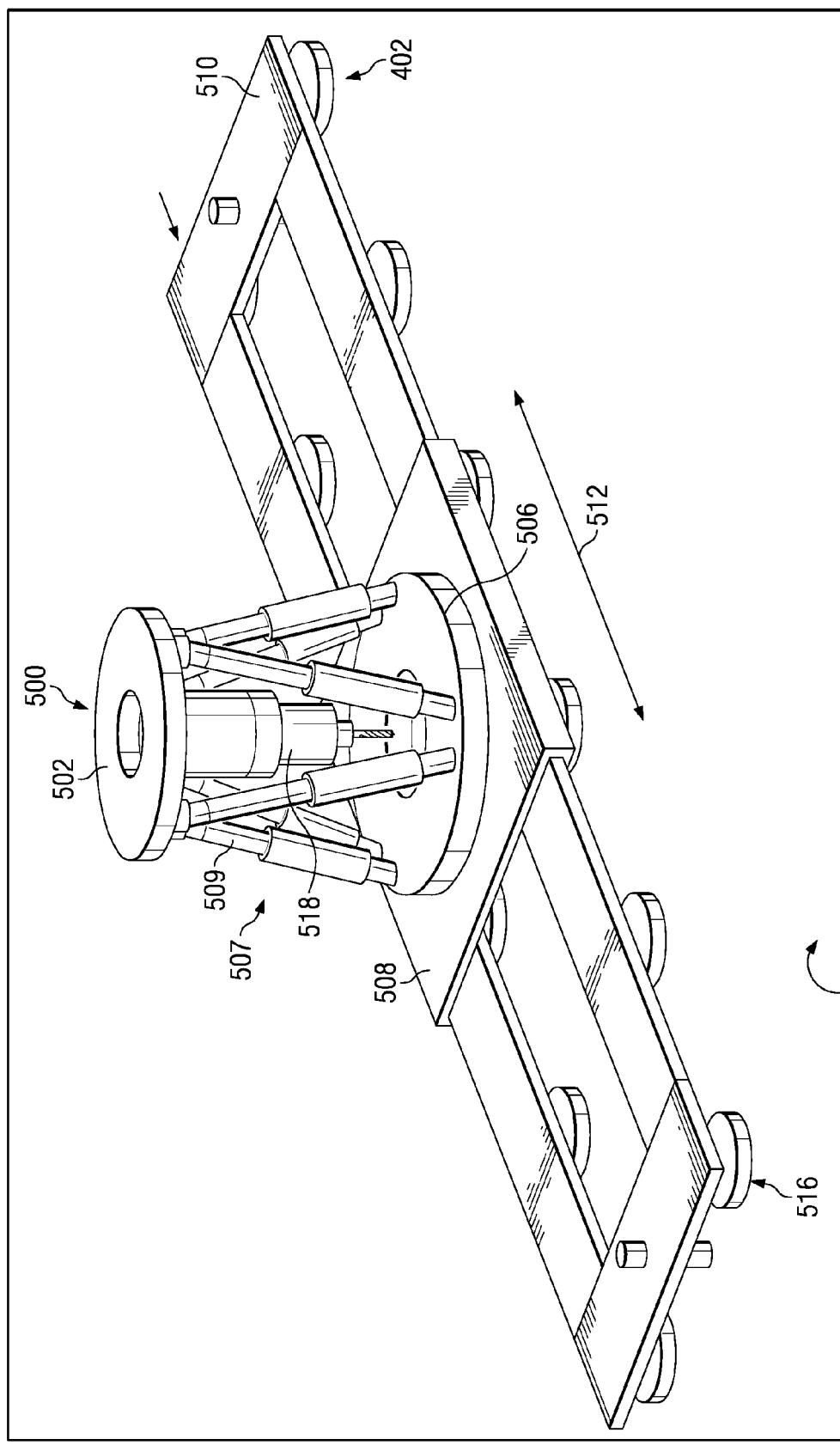
FIG. 5 is an illustration of a manufacturing apparatus in accordance with an advantageous embodiment.

Turning now to FIG. 5, an illustration of a manufacturing apparatus is depicted in accordance with an advantageous embodiment. In this illustrative example, manufacturing apparatus 402 in FIG. 4 is shown in more detail.

Manufacturing apparatus 402 may take the form of hexapod 500 and may comprise moveable platform 502. In these illustrative examples, manufacturing apparatus 402 may comprise moveable platform 502, actuation system 507, and fixed platform 506. In these examples, actuation system 507 may comprise plurality of linear actuators 509. Moveable platform 502 may be attached to fixed platform 506 via actuation system 507. In these illustrative examples, actuation system 507 for moveable platform 502 may be attached to fixed platform 506. Moveable platform 502 is thus enabled to move relative to fixed platform 506 in this example.

Fixed platform 506 may be secured to carriage system 508 and may be moveable along track system 510 in the direction of arrows 512. Track system 510 may be secured to surface 514 of structure 404 using vacuum system 516.

As illustrated, moveable platform 502 may be connected to tool 518, which may be moved to different locations by moving actuation system 507 and positioning actuation system 507 to perform operations on surface 406 of structure 404 in FIG. 4.

Figure 6:
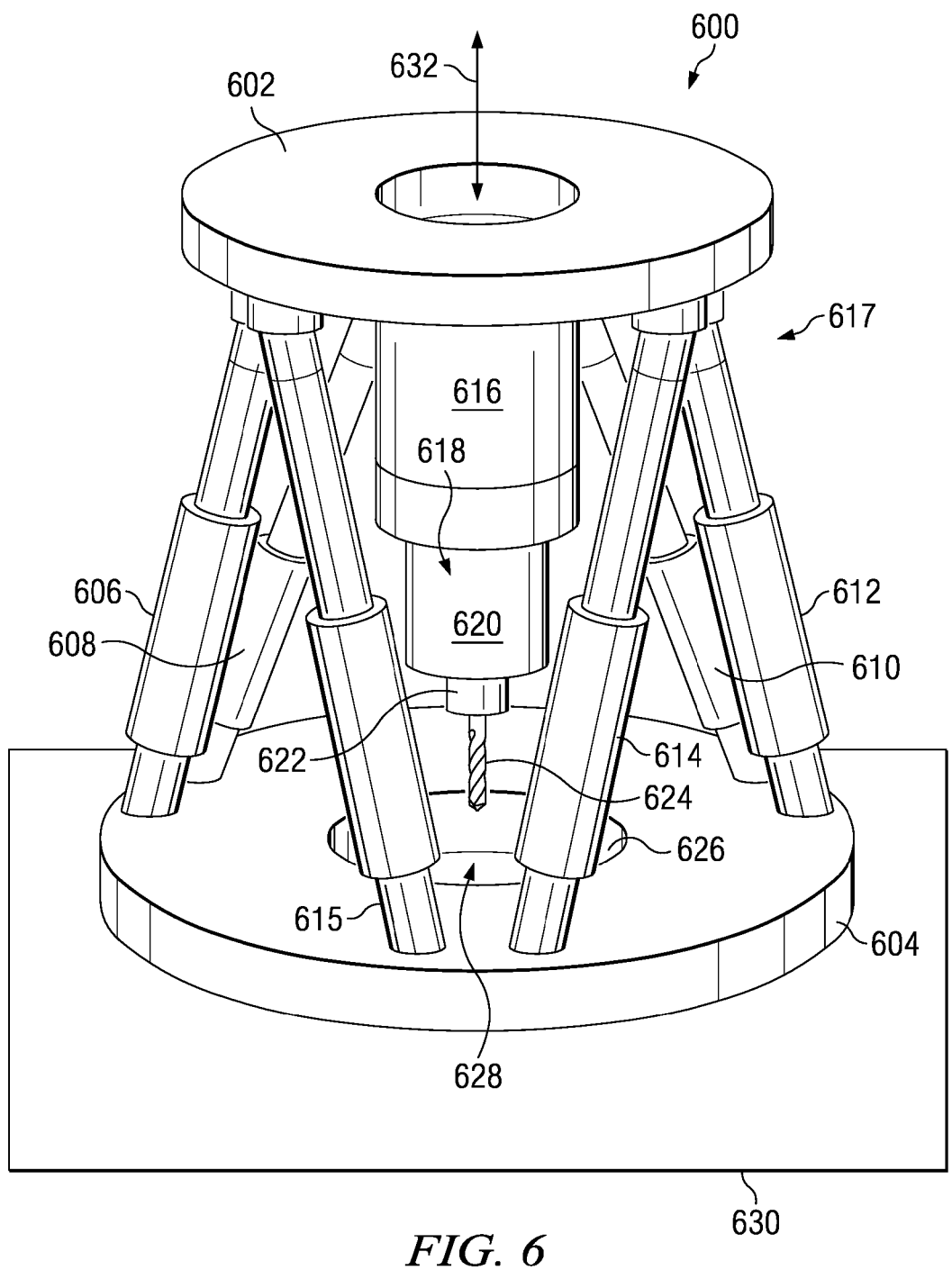
FIG. 6 is an illustration of a manufacturing apparatus in accordance with an advantageous embodiment.

With reference now to FIG. 6, an illustration of a manufacturing apparatus is depicted in accordance with an advantageous embodiment. Manufacturing apparatus 600 is an example of an implementation for manufacturing apparatus 302 in FIG. 3.

In this illustrative example, manufacturing apparatus 600 may comprise moveable platform 602, fixed platform 604, actuator 606, actuator 608, actuator 610, actuator 612, actuator 614, actuator 615, and Z-axis actuator 616. Actuator 606, actuator 608, actuator 610, actuator 612, actuator 614, actuator 615, and Z-axis actuator 616 form actuation system 617 in these illustrative examples. In these examples, these actuators may take the form of linear actuators.

Additionally, manufacturing apparatus 600 also may have tool 618. Tool 618 may comprise spindle motor 620, spindle 622, cutter 624, and/or any other suitable components. Opening 626 in fixed platform 604 may define work envelope 628 in these illustrative examples. The combination of actuators for manufacturing apparatus 600 may allow six degrees of freedom for positioning tool 618, as well as for performing operations through work envelope 628. Further, Z-axis actuator 616 in actuation system 617 may move spindle motor 620, spindle 622, and cutter 624 along Z-axis 632.

With this configuration, manufacturing apparatus 600 may have a smaller size as compared to currently available manufacturing apparatus for drilling holes and/or performing other operations on an aircraft. Manufacturing apparatus 600 may be mounted to structure 630, on which operations may be performed. For example, fixed platform 604 may be mounted to structure 630.

Figure 7:
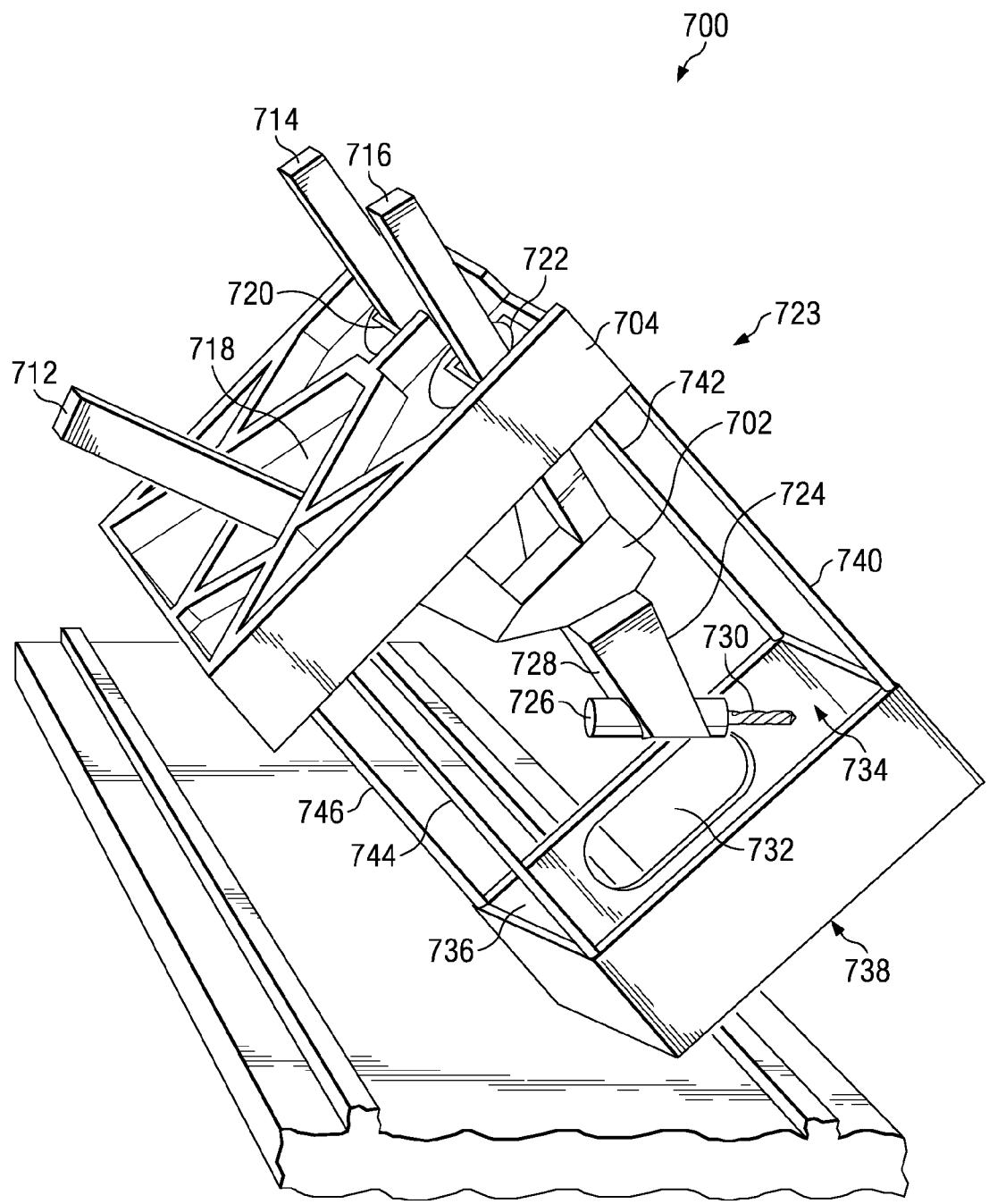
FIG. 7 is an illustration of a manufacturing apparatus in accordance with an advantageous embodiment.

Turning now to FIG. 7, an illustration of a manufacturing apparatus is depicted in accordance with an advantageous embodiment. As depicted, manufacturing apparatus 700 is an example of one implementation for manufacturing apparatus 302 in FIG. 3.

Manufacturing apparatus 700 may have moveable platform 702 and fixed platform 704. Moveable platform 702 may be associated with fixed platform 704 through elongate members 712, 714, and 716. These elongate members may be moveable using motors 718, 720, and 722. These elongate members and motors may form actuation system 723 in the illustrative examples.

Further, moveable member 724 also may be attached to moveable platform 702. Tool 726 may be attached to moveable member 724. In these examples, tool 726 may be motor 728 with cutting tool 730. Working envelope 732 may be defined by area 734 on surface 736 of structure 738 that may be reached by tool 726. In this example, moveable platform 702 may be maintained relative to surface 736 of structure 738 by positioning members 740, 742, 744, and 746 on fixed platform 704.

Depending on the particular implementation, working envelope 732 may extend beyond positioning members 740, 742, 744, and 746. In these illustrative examples, positioning members 740, 742, 744, and 746 may be attached to a carriage similar to carriage system 508 for use with track system 510 in FIG. 5.

Figure 8:
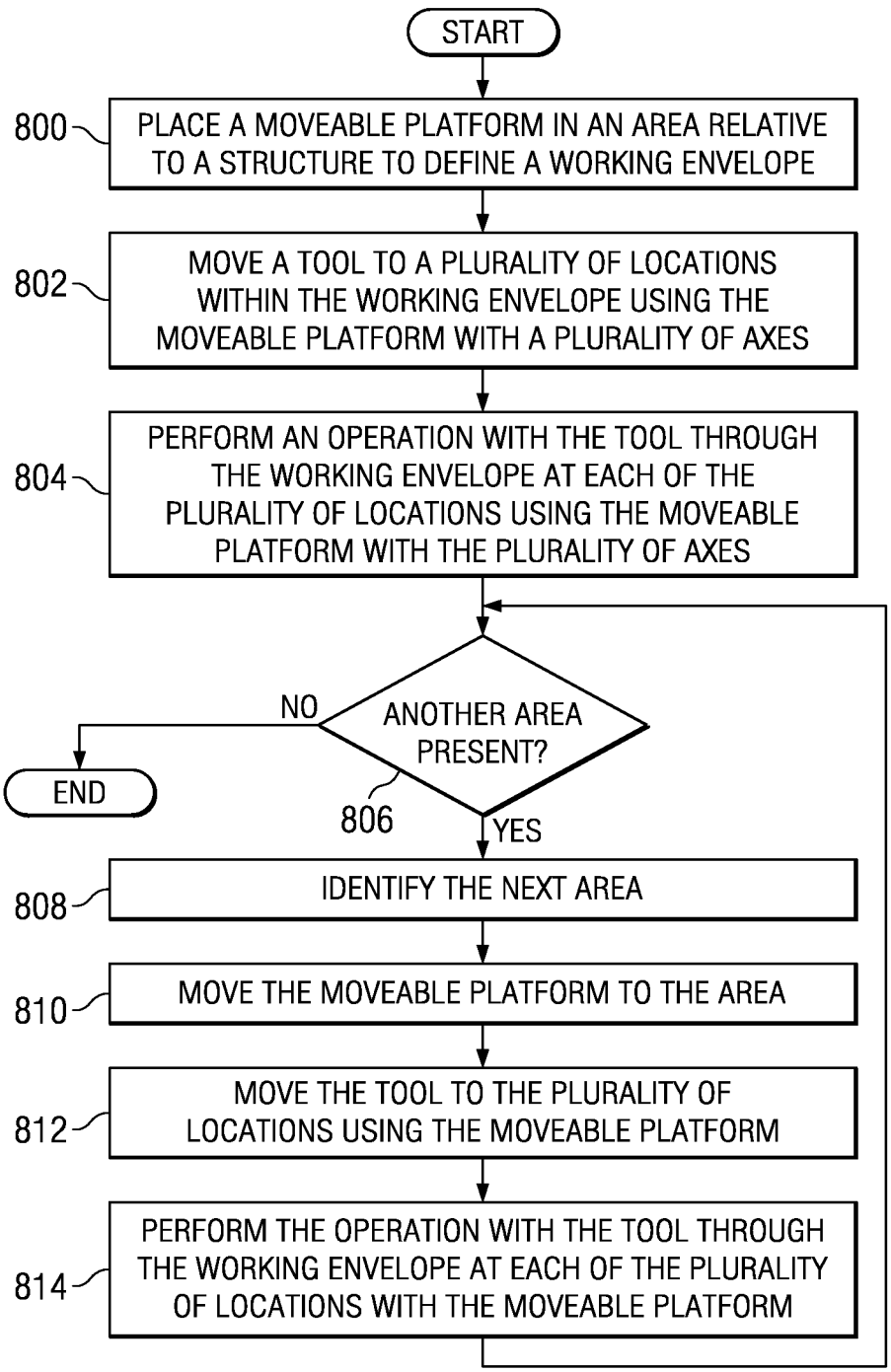
FIG. 8 is an illustration of a flowchart for performing operations on a structure in accordance with an advantageous embodiment.

Turning now to FIG. 8, an illustration of a flowchart for performing operations on a structure is depicted in accordance with an advantageous embodiment. The process illustrated in FIG. 8 may be implemented in a manufacturing environment such as, for example, without limitation, manufacturing environment 300 in FIG. 3.

The process may begin by placing moveable platform 308 in area 330 relative to structure 306 to define working envelope 332 (operation 800). Moveable platform 308 may be connected to tool 310. Tool 310 may be moveable around plurality of axes 311 by moveable platform 308.

The process may then move tool 310 to plurality of locations 334 within working envelope 332 using moveable platform 308 with plurality of axes 311 (operation 802). Operation 328 may be performed with tool 310 through working envelope 318 at each of plurality of locations 334 using moveable platform 308 with plurality of axes 311 (operation 804). A determination may be made as to whether another area is present on which operation 328 may be performed (operation 806). If another area is present, the next area is identified (operation 808).

Thereafter, moveable platform 308 may be moved to area 330 (operation 810). Thereafter, tool 310 may be moved to plurality of locations 334 using moveable platform 308 (operation 812). Operation 328 may be performed with tool 310 through working envelope 332 at each of plurality of locations 334 with moveable platform 308 (operation 814). The process then returns to operation 806. With reference again to operation 806, if another area is not present, the process terminates.

Figure 9:
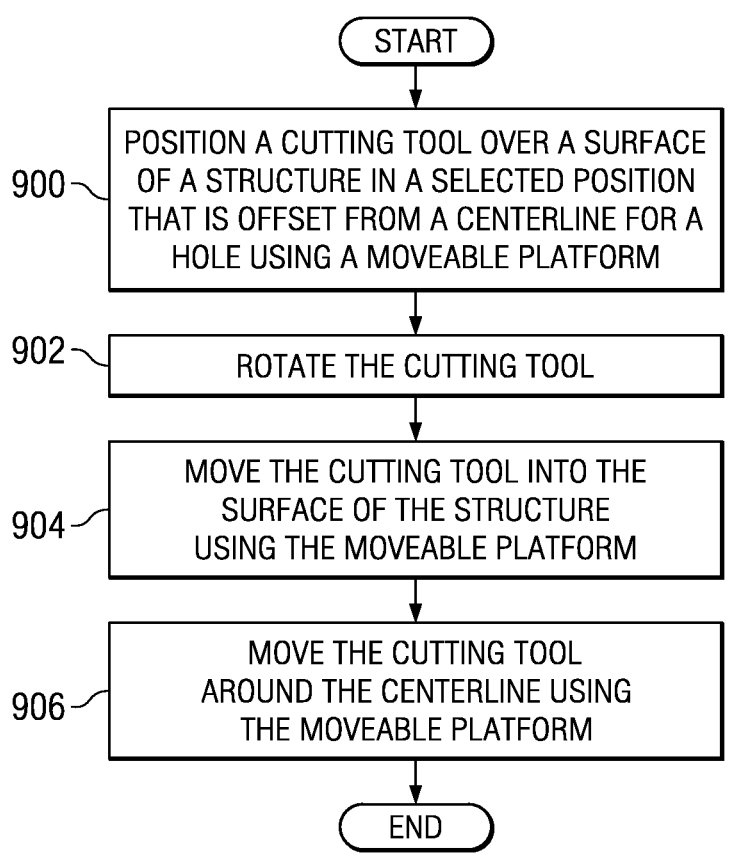
FIG. 9 is an illustration of a flowchart for performing a drilling operation at a location in accordance with an advantageous embodiment.

With reference now to FIG. 9, an illustration of a flowchart for performing a drilling operation at a location is depicted in accordance with an advantageous embodiment. The process illustrated in FIG. 9 may be implemented in manufacturing environment 300 using manufacturing apparatus 302 when tool 310 takes the form of spindle motor 337 and cutting tool 338 as depicted in FIG. 3.

The process may begin by positioning cutting tool 338 over surface 324 of structure 306 in a selected position that is offset from centerline 344 for hole 346 using moveable platform 308 (operation 900). Responsive to positioning cutting tool 338, cutting tool 338 is rotated (operation 902).

Responsive to rotating cutting tool 338, cutting tool 338 may be moved into surface 324 of structure 306 using moveable platform 308 (operation 904). In operation 904, moveable platform 308 may move in some advantageous embodiments. In other advantageous embodiments, moveable platform 308 may move cutting tool 338 into surface 324 of structure 306 through an actuator in actuation system 315. For example, without limitation, actuation system 315 may include a Z-axis actuator that moves a spindle along an axis.

Responsive to rotating cutting tool 338, the process may move cutting tool 338 around centerline 344 using moveable platform 308 (operation 906), with the process terminating thereafter. This movement around centerline 344 may be a circular motion, an oval motion, and/or some other suitable motion. In some advantageous embodiments, the movement that occurs in operations 904 and 906 may be a spiral-type movement.

Thus, the different advantageous embodiments provide a method for performing operations on a structure. In the different advantageous embodiments, moveable platform 308 may be positioned in area 326 relative to structure 306 to define working envelope 318. Moveable platform 308 may be connected to tool 310, which is moved around using plurality of axes 311 and moveable platform 308. Tool 310 may be moved to plurality of locations 320 within working envelope 318 using moveable platform 308. Operation 328 may be performed using tool 310 through working envelope 318 at each of plurality of locations 320 using moveable platform 308.

Thus, in this manner, the different advantageous embodiments may provide a capability to perform operations using a smaller size manufacturing apparatus as compared to currently used mechanisms. The moveable platform in the different illustrative examples may provide a capability to both move the tool to different locations on an area on which operations are to be performed, as well as move and/or manipulate the tool to actually perform the operations.

In the different advantageous embodiments, the manufacturing apparatus provides a capability to incorporate the same axes for positioning the tool as well as performing the operation. With one or more of the different advantageous embodiments, a capability may be provided in which positioning capabilities of existing portable machines with an orbital drive may be combined with offset adjustment capabilities of a numerically controlled motor into a single machine.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of structures.

For example, without limitation, other advantageous embodiments may be applied to a mobile platform, a stationary platform, a land-based structure, an aquatic-based structure, a space-based structure, and/or some other suitable object. As a more specific example, the structure may be a surface ship, a tank, a personnel carrier, a train, a spacecraft, a space station, a satellite, an aircraft wing, an aircraft empennage, a fuselage, a nacelle, an engine case, a submarine, an automobile, a power plant, a bridge, a dam, a manufacturing facility, and a building.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing operations on a structure, the method comprising:
    positioning a fixed platform associated with a moveable platform in an area relative to the structure to define a working envelope, wherein the working envelope is defined by an opening in the fixed platform, wherein the fixed platform is associated with the moveable platform through an actuation system for the moveable platform, and wherein the moveable platform is connected to a tool that is moveable around a plurality of axes using the moveable platform;
    moving the tool to a plurality of locations within the working envelope using the moveable platform; and
    performing an operation with the tool through the working envelope at each of the plurality of locations using the moveable platform.

2. The method of claim 1 further comprising:
    responsive to performing the operation with the tool through the working envelope at each of the plurality of locations, positioning the fixed platform associated with the moveable platform to another area relative to the structure to form a second working envelope;
    moving the tool to another plurality of locations within the second working envelope using the moveable platform; and
    performing another operation through the second working envelope at each of the another plurality of locations using the moveable platform.

3. The method of claim 2, wherein the positioning step comprises:
    moving the fixed platform associated with the moveable platform on a track system attached to the structure.

4. The method of claim 3, wherein the fixed platform associated with the moveable platform is attached to a carriage capable of moving along the track system.

5. The method of claim 1, wherein the moving and performing steps are controlled by a processor unit executing program code, wherein the program code defines a plurality of operations.

6. The method of claim 1 further comprising:
    moving the fixed platform associated with the moveable platform to a number of areas on the structure, wherein an associated working envelope is defined at each of the number of areas.

7. The method of claim 1 further comprising:
    normalizing the tool relative to the structure using the moveable platform prior to performing the operation.

8. The method of claim 1, wherein the moveable platform and the tool are part of a parallel kinematics machine.

9. The method of claim 8, wherein the parallel kinematics machine comprises a hexapod, wherein the tool is connected to the hexapod.

10. The method of claim 1, wherein the opening in the fixed platform exposes a surface of the structure to the tool.

11. The method of claim 1, wherein the performing step comprises:
    at each of the plurality of locations, positioning a cutting tool over a surface of the structure in a selected position that is offset from a centerline for a hole using the moveable platform;
    responsive to positioning the cutting tool, rotating the cutting tool;
    responsive to rotating the cutting tool, moving the cutting tool into the surface of the structure using the moveable platform; and
    responsive to rotating the cutting tool, moving the cutting tool around the centerline using the moveable platform.

12. The method of claim 1, wherein the operation is selected from one of a drilling operation, a riveting operation, a boring operation, a fastening operation, a sealing operation, a measurement operation, a marking operation, and a painting operation.

13. The method of claim 1, wherein the tool is selected from one of a drill, a rivet gun, a sealant applicator, a paint gun, a laser, a probe, an ultrasonic drill, and a fastener machine.

14. The method of claim 1, wherein the plurality of axes provide six degrees of freedom.

15. The method of claim 1, wherein the working envelope is each portion of the structure at the area capable of being reached by the tool using the moveable platform to perform the operation.

16. The method of claim 1, wherein the structure is selected from one of a mobile platform, a stationary platform, a land-based structure, an aquatic-based structure, a space-based structure, an aircraft, a surface ship, a tank, a personnel carrier, a train, a spacecraft, a space station, a satellite, an aircraft wing, an aircraft empennage, a fuselage, a nacelle, an engine case, a submarine, an automobile, a power plant, a bridge, a dam, a manufacturing facility, and a building.

17. A method for drilling holes in an aircraft structure, the method comprising:

placing a fixed platform associated with a moveable platform in a form of a hexapod in an area relative to the aircraft structure to define a working envelope, wherein the moveable platform is connected to a cutting tool that is moveable around a plurality of axes using the moveable platform, wherein the fixed platform is associated with the moveable platform through an actuation system for the moveable platform, and wherein the working envelope is defined by an opening in the fixed platform in which the opening exposes a surface of the aircraft structure to the cutting tool;

moving the cutting tool to a plurality of locations within the working envelope using the moveable platform;

normalizing the cutting tool relative to the aircraft structure prior to performing an operation at each of the plurality of locations using the moveable platform; and performing a drilling operation through the working envelope at each of the plurality of locations using the moveable platform to form a plurality of holes in the aircraft structure in the area by:

at each of the plurality of locations, positioning a cutting tool over the surface of the aircraft structure in a selected position that is offset from a centerline for a hole using the moveable platform;

responsive to positioning the cutting tool, rotating the cutting tool;

responsive to rotating the cutting tool, moving the cutting tool into the surface of the aircraft structure using the moveable platform; and responsive to rotating the cutting tool, moving the cutting tool around the centerline using the moveable platform;

wherein the moveable platform is placed at the area by moving the fixed platform on a track system attached to the structure to the area, wherein the fixed platform is attached to a carriage capable of moving along the track system, wherein the moving and performing steps are controlled by a processor unit executing program code, and wherein the program code defines a plurality of operations.

* * * * *